(12) United States Patent
Bartel-Kurz et al.

(10) Patent No.: US 9,165,121 B2
(45) Date of Patent: Oct. 20, 2015

(54) CONCEPT OF EFFICIENTLY DISTRIBUTING ACCESS AUTHORIZATION INFORMATION

(75) Inventors: Birgit Bartel-Kurz, Erlangen (DE); Stefan Kraegeloh, Erlangen (DE); Markus Prosch, Erlangen (DE); Rinat Zeh, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 690 days.

(21) Appl. No.: 12/989,140

(22) PCT Filed: Apr. 21, 2009

(86) PCT No.: PCT/EP2009/002909
§ 371 (c)(1),
(2), (4) Date: Jan. 5, 2011

(87) PCT Pub. No.: WO2009/130007
PCT Pub. Date: Oct. 29, 2009

(65) Prior Publication Data
US 2011/0093930 A1     Apr. 21, 2011

(30) Foreign Application Priority Data

Apr. 25, 2008    (DE) .......................... 10 2008 020 832

(51) Int. Cl.
  *G06F 21/30*   (2013.01)
  *G06F 21/10*   (2013.01)
(52) U.S. Cl.
  CPC ........ *G06F 21/10* (2013.01); *G06F 2221/0764* (2013.01)
(58) Field of Classification Search
  CPC ............ G06F 21/10; G06F 2221/0764; G06F 21/6218; H04L 63/08; H04L 63/102; H04L 63/10; H04W 12/06
  USPC ............................................................ 726/4
  See application file for complete search history.

(56) References Cited

U.S. PATENT DOCUMENTS 5,818,915 A    10/1998 Hayes, Jr.
6,393,562 B1 *  5/2002 Maillard ........................ 713/150
(Continued)

FOREIGN PATENT DOCUMENTS

EP    0866613    9/1998
EP    1094667    4/2001
(Continued)

OTHER PUBLICATIONS

ETSI TS 102 367 V1.1.1, Digital Audio Broadcasting Conditional access, Jan. 2005.*

*Primary Examiner* — Shan Elahi
(74) *Attorney, Agent, or Firm* — Michael A. Glenn; Perkins Coie LLP

(57) ABSTRACT

A device for controlling a service access authorization for a user device with regard to an access-restricted service includes a service access authorization provider, the service access authorization provider being configured to set a period of time in which the service access authorization is valid, responsive to an authorization message provided with a service-dependent user identifier, and the service access authorization provider being configured to disable an authorization allowing the service access authorization to be extended or reactivated using the previous service-dependent user identifier when at least a predetermined duration has passed since an end of a last authorization time interval for which a service access authorization was determined by the device.

22 Claims, 10 Drawing Sheets

(56) References Cited

U.S. PATENT DOCUMENTS

| | | | |
|---|---|---|---|
| 6,754,482 B1* | 6/2004 | Torabi | 455/410 |
| 6,766,305 B1 | 7/2004 | Fucarile et al. | |
| 6,957,342 B2* | 10/2005 | Vatanen | 713/192 |
| 7,065,588 B2* | 6/2006 | Konda et al. | 709/246 |
| 7,202,772 B2* | 4/2007 | Emmerling et al. | 340/5.72 |
| 7,587,736 B2* | 9/2009 | Summers et al. | 725/95 |
| 7,954,150 B2* | 5/2011 | Croft et al. | 726/21 |
| 7,996,672 B1* | 8/2011 | Agrawal et al. | 713/165 |
| 8,006,087 B2* | 8/2011 | Ginter et al. | 713/164 |
| 8,055,913 B2* | 11/2011 | Ginter et al. | 713/194 |
| 8,095,787 B2* | 1/2012 | Kanekar et al. | 713/156 |
| 8,132,247 B2* | 3/2012 | Adhya et al. | 726/11 |
| 8,171,524 B2* | 5/2012 | Micali et al. | 726/2 |
| 8,413,229 B2* | 4/2013 | Mullick et al. | 726/15 |
| 8,532,304 B2* | 9/2013 | Asokan et al. | 380/284 |
| 8,533,851 B2* | 9/2013 | Ginter et al. | 726/27 |
| 8,561,155 B2* | 10/2013 | He et al. | 726/5 |
| 2002/0135801 A1* | 9/2002 | Tessman et al. | 358/1.15 |
| 2003/0018535 A1 | 1/2003 | Hideo et al. | |
| 2003/0043018 A1* | 3/2003 | Gerstenkorn | 340/5.61 |
| 2003/0140103 A1* | 7/2003 | Szeto et al. | 709/206 |
| 2004/0019801 A1* | 1/2004 | Lindholm et al. | 713/200 |
| 2004/0170278 A1* | 9/2004 | Schipper | 380/239 |
| 2005/0007243 A1* | 1/2005 | Emmerling et al. | 340/426.1 |
| 2006/0059090 A1* | 3/2006 | Lahtinen et al. | 705/50 |
| 2006/0069503 A1* | 3/2006 | Suomela et al. | 701/211 |
| 2006/0248596 A1 | 11/2006 | Jain et al. | |
| 2007/0223703 A1* | 9/2007 | Verma et al. | 380/278 |
| 2007/0271187 A1* | 11/2007 | Kurihara et al. | 705/51 |
| 2008/0063195 A1* | 3/2008 | Li | 380/200 |
| 2008/0120708 A1* | 5/2008 | Waisbard et al. | 726/6 |
| 2008/0229409 A1* | 9/2008 | Miller et al. | 726/19 |
| 2009/0271870 A1* | 10/2009 | Vepsalainen | 726/27 |

FOREIGN PATENT DOCUMENTS

| | | |
|---|---|---|
| EP | 1840779 | 10/2007 |
| JP | 200276350 | 10/2000 |
| JP | 2002150077 | 5/2002 |
| JP | 2002189957 | 7/2002 |
| JP | 2003535507 | 11/2003 |
| JP | 2003018535 | 2/2005 |
| JP | 2005038235 | 2/2005 |
| JP | 2005-516294 | 6/2005 |
| JP | 2007122464 | 5/2007 |
| WO | WO-0193540 | 12/2001 |
| WO | WO03/063524 | 7/2003 |
| WO | WO-2006048856 | 5/2006 |

* cited by examiner

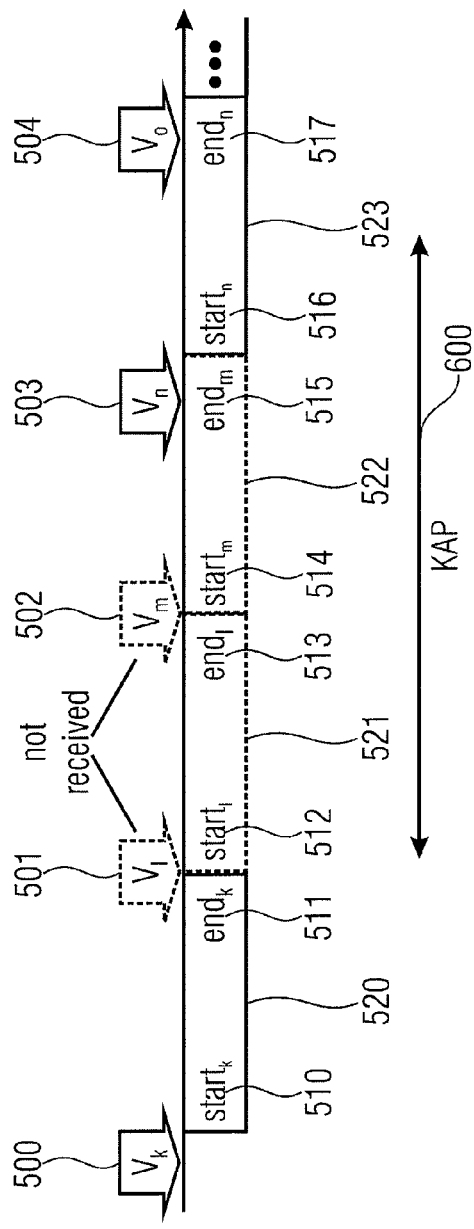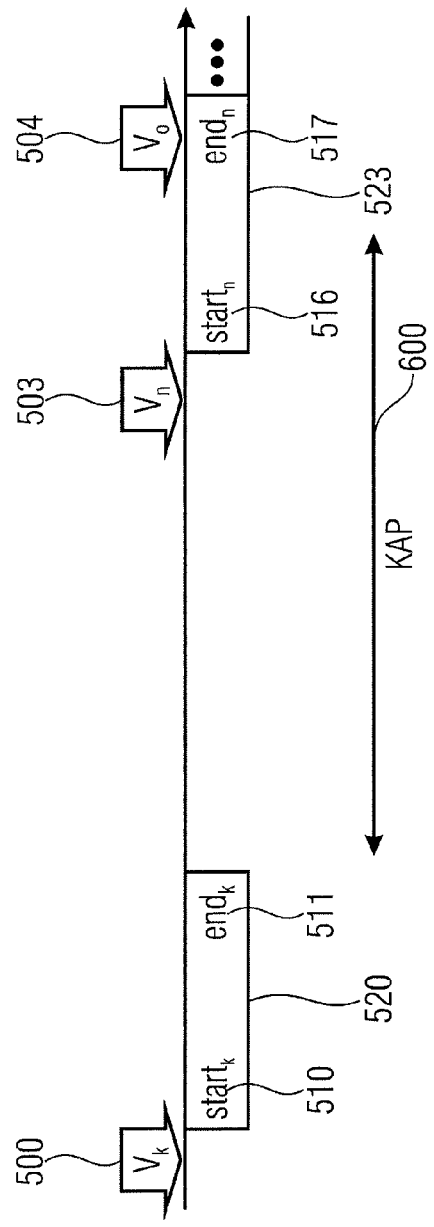

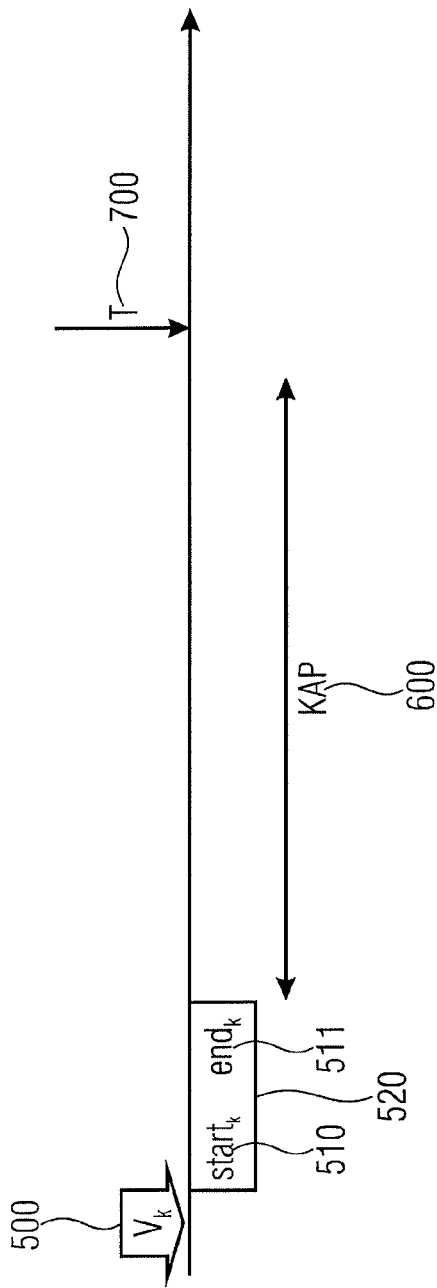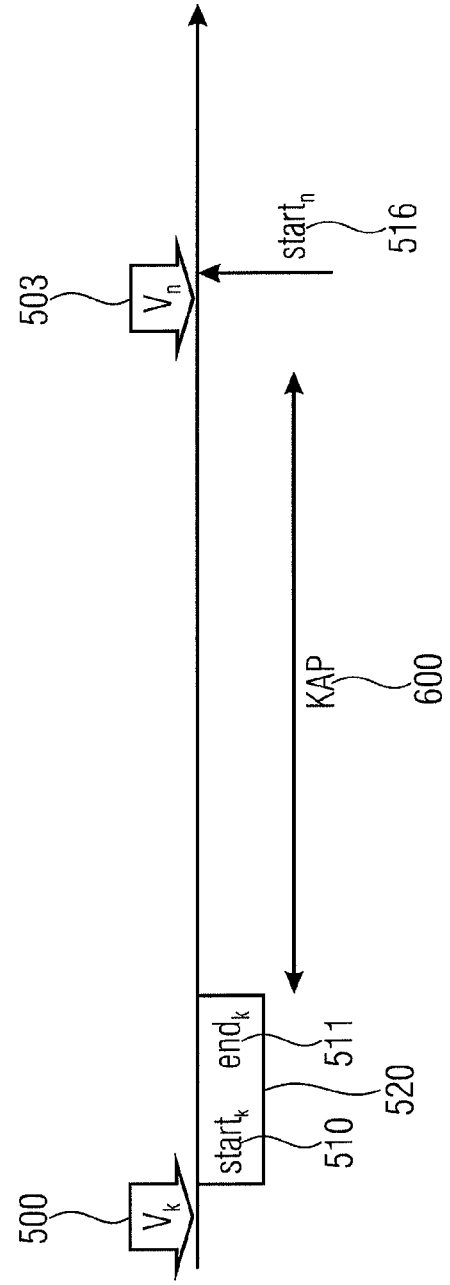

CONCEPT OF EFFICIENTLY DISTRIBUTING ACCESS AUTHORIZATION INFORMATION

CROSS-REFERENCE TO RELATED APPLICATION

This application is a U.S. National Phase entry of PCT/EP2009/002909 filed Apr. 21, 2009, and claims priority to German Patent Application No. 10 2008 020832.9 filed Apr. 25, 2008, each of which is incorporated herein by references hereto.

BACKGROUND OF THE INVENTION

The present invention relates to a concept of efficiently distributing access authorization information for a digital rights management system or an access authorization system. The present invention also relates to a device and a method for controlling a service access authorization, to a device and a method for providing an authorization message, and to a system for controlling a service access authorization.

Digital rights management systems, also referred to as DRM systems, are methods using which the usage and distribution of digital media are to be checked on. Digital usage management may particularly be employed in digital movie and sound recording, but also in software, electronic documents or electronic books. It allows providers employing such digital rights management systems for checking the usage of their data, to apply new ways of billing, such as, for example, paying for rights of using data by means of licenses and authorizations, instead of paying for the data themselves.

Authors and exploiters are often interested in checking or limiting the circulation and usage of their intellectual property, even after passing same on. A digital rights management system is to support allowing data to be used only to the extent defined by the respective rights proprietors, i.e. the license.

Meanwhile, however, digital rights management systems are also to be found in many other fields, such as, for example, in companies to protect documents, which are then also referred to as corporate rights management systems.

Digital rights management systems are a technical safety measure of giving a rights proprietor of information goods a way of technically enforcing the type of usage of his or her property by users on the basis of a usage agreement made before.

In addition, digital rights management systems allow managing digital contents beyond a purely flat-rate payment and allow individual licensing or billing depending on the frequency, duration or range of usage. On the one hand, unlimited usage can be restricted while, on the other hand, models of doing business which could hardly be realized so far become possible upon request.

Examples of digital rights management systems are the system of Open Mobile Alliance, referred to as OMA DRM, and the OMA standard in the versions OMA DRM V1.0 (http://www.openmobilealliance.org/technical/release_program/drm_v1_0.aspx), OMA DRM V2.0 (http://www.openmobilealliance.org/technical/release_program/drm_v2_0.aspx) and OMA DRM V2.1 (http://www.openmobilealliance.org/technical/release_program/drm_v2_1.aspx), and the system of ETSI standard EN 50094 referred to as EUROCRYPT, in the version BS EN 50094:1993 or Eurocrypt BE EN 50094:1993 (http://www.beuth.de/langanzeige/BS+EN+50094/9799264.html). Additionally, there are a large number of proprietary digital rights management systems which are partly specified on open platforms.

The article "Digital rights management" published by the online encyclopedia Wikipedia on Apr. 23, 2008 gives an overview of digital rights management systems and briefly describes the "Fairplay" system by the manufacturer "Apple" under the term of application "ITunes Store", and the "Windows Media DRM" system by the manufacturer "Microsoft".

The most widespread digital rights management systems are "Fairplay" by the manufacturer Apple, "Windows Media DRM" by the manufacturer Microsoft and the OMA DRM system by Open Mobile Alliance Standardization. They allow the authorizations to be set precisely and may be used for different audio and video files. The market leader Apple, for example, uses "Fairplay" in an application referred to as "ITunes Store". Other providers of digital contents are, for example, Napster or Musicload. Video providing services predominantly use the DRM system by the manufacturer Microsoft. The OMA DRM system is used for ring tones, images, but also for mobile music and TV transmission, such as, for example, by the contents providers Vodafone or T-Mobile, in almost every mobile phone. The OMA DRM and Windows Media DRM systems are frequently combined to allow interoperability between mobile phones and PCs. The providers Musicload and Vodafone are exemplary here.

Digital rights management systems may play a more important role in the future in many other fields, such as, for example, in the automobile field, for example for protecting software or real-time navigation or online navigation, or in the field of embedded systems.

Digital rights management systems mostly use cryptographic methods for controlling access to digital contents. This may exemplarily be realized by binding any digital contents unambiguously to a license by means of encryption. Without the valid license belonging to the digital contents, the user may purchase the apparatus or data carrier, but cannot access the contents. The contents management computer exemplarily manages the digital contents to be protected and encrypts same for being used in a digital rights management system, thereby making the contents at first unreadable. The license management computer may, upon request, generate the license needed in connection with the respective keys for user authentication and contents decryption. When the user wants to access protected contents, he can request the license necessary for reproduction from the license management computer by means of the digital rights management controller. In case authenticity and integrity of a reproduction program have been verified successfully, the contents, for example, are decrypted using the key contained in the license, in this way rendered readable again and passed on to the reproduction program.

Access authorization systems or access encryption systems, also referred to as conditional access (CA) systems, exemplarily include the systems employed in pay TV or in pay video fetch applications for encrypting and decrypting program contents which may meanwhile be employed also in other digital broadcast/radio systems and for vehicle assistance.

In order for a receiver to be able to decrypt the contents, he needs a continuously changing control word, for example. Having the receiver obtain this control word and thus only addressing certain receivers is one of the tasks of the access authorization systems.

Exemplarily, the provider transmits, in parallel to the useful data, separate data packages as management messages which are also referred to as ECM messages. By means of these ECM messages, a receiver having the respective authorization may exemplarily calculate the control word valid at that time and transmit same to the contents decoder. Same is then able to decrypt the contents received. On the receiver side, an access authorization system is, for example, mapped by an authorization card bound to the customer in the form of a smart card, and a customer-anonymous access authorization module. The module here can filter those packages including management messages from the data stream and calculate the corresponding control word by means of the information given in connection with the authorization card. Logic of the access authorization system may be distributed, on the one hand, to the module and, on the other hand, to the authorization card. Holding customer-specific data on the authorization card and rendering them unreadable by third parties is, for example, a conventional procedure.

In addition to the information which may already be on the authorization card of the customer, the methods may transmit management messages including management commands via the incoming data stream. These management messages, also referred to as EMM messages, serve specifically enabling and disabling customer cards. There is a way of offering the customer more or fewer rights with regard to individual offer packages, without the customer having to exchange the authorization card.

Examples of digital access authorization systems are the "Betacrypt" and "Betacrypt II" systems for digital pay TV which were developed for an application referred to as D-Box, further the system referred to as "Videoguard" for pay TV, broadband TV and mobile applications, and a system, referred to as "Nagravision Aladin" offering access authorization methods for both satellite and cable TV.

In the article "Conditional access" of the online encyclopedia Wikipedia of Mar. 12, 2008, the digital PayTV systems "Videoguard" and "Nagravision Aladin" are mentioned and described briefly in the linked articles "Nagravision" of Jan. 8, 2008 and "Videoguard" of Apr. 20, 2008. The Wikipedia article "Conditional access system" of Dec. 21, 2007 mentions Betacrypt as another access authorization system which has meanwhile been replaced by the Betacrypt II system.

Since, in unidirectional broadcast systems, receivers are usually not able to confirm messages received, and are not always switched on, all the messages, for example, may have to be transmitted repeatedly in order to ensure high receive quality. In order to ensure a high security standard, the access authorization messages can be encrypted securely such that decryption without having a valid access key is either not feasible economically or technically almost impossible. Additionally, different individual access authorization systems may be separated from one another such that they do not influence one another.

Digital rights management systems and access authorization systems allow a service provider to distribute protected multimedia contents to closed groups of users. Distributing may take place using different systems, exemplarily via an analog or digital video or audio broadcast system, via a mobile radio communications system, via an Internet protocol system or a digital multimedia transmission system. DVB (digital video broadcast) systems, GSM (global system for mobile communications) systems, IP (Internet protocol) systems and DAB/DMB (digital audio/multimedia broadcast) systems are, among others, common systems.

The contents may be encrypted before distributed. The usage rules and the cryptographic keys needed may be distributed in additional management messages. The contents may be grouped relating to services. The users of a service are, for example, a group of persons who may be managed on the transmitter side.

A user may access a service when having stored the authorizations needed in his apparatus or in a security component connected to the apparatus, such as, for example, an authorization card (chip card). A user may obtain the authorization in a personalization process.

A common business model between a service provider and a service user is regulating access using a subscription. The service authorization is exemplarily valid for a certain period of time and may, when expired, be extended in case there is an ongoing business relationship between the service provider and the service user. The extension ($V_n$) is exemplarily done by a management message which may relate to a certain service. It may contain parameters in which the extension period of time (start$_n$, end$_n$) may be coded, exemplarily by means of an extension start time (start$_n$) and an extension end time (end$_n$).

When a digital rights management system or an access authorization system is employed in an environment in which a plurality of receivers can receive the signal transmitted ("point-to-multipoint"), such as, for example, a digital broadcast system, an extension message may be directed to several service users at the same time. This means that an extension message may comprise an address region in which a list of the service users to be extended is located. With these service users, both the time of extension, exemplarily December $31^{st}$, and the extension period, exemplarily 3 months, may be identical.

When a subscription is not extended, no extension method is, for example, transmitted for the corresponding service user. His access authorization expires.

The end of an access authorization usually coincides with the time of expiry of a subscription.

Subscriber management systems managing a plurality of subscriber data of service users of digital rights management systems or access authorization systems may, for the management of the subscriber data, need personalization in which a service-dependent user identification, referred to here as "i", may be allocated to an apparatus of a user having an apparatus identification, referred to here as "g", for a certain service having a service identification, referred to here as "d", wherein the service-dependent user identification may depend on the apparatus identification and service identification. As a formula, this is expressed as: i=f(g,d), wherein "f( )" is to refer to an association function. Other associations are also possible when personalizing.

The apparatus identification, the service identification and the user identification may be stored on the transmitting side in a subscriber management system.

The peripheral exemplarily knows the apparatus identification allocated to it for the personalization of an additional service. After personalizing a plurality, exemplarily a number n, of services the apparatus may store a list of service-dependent user identifications permanently (or temporarily), wherein the list may exemplarily be represented as a sequence of numbers $(d_1, i_1), \ldots, (d_n, i_n)$ of n pairs of service identification and user identification having an index between 1 and n. The apparatus exemplarily knows its own user identification i for every active service having the service identification d and can be addressed using same.

The service-dependent user identification is exemplarily temporary for the period of time for which there is a corresponding service authorization.

SUMMARY

According to an embodiment, a device for controlling a service access authorization for a user device with regard to an access-restricted service may have: a service access authorization provider, the service access authorization provider being configured to set a period of time in which the service access authorization is valid, responsive to an authorization message provided with a service-dependent user identifier, and the service access authorization provider being configured to disable an authorization allowing the service access authorization to be extended or reactivated using the previous service-dependent user identifier depending on whether at least a predetermined duration has passed since an end of a last authorization time interval for which a service access authorization was determined by the device, wherein the service access authorization provider is configured to determine the duration having passed and to compare same to the predetermined duration, and to disable the authorization for extending or reactivating using the previous service-dependent user identifier when the duration having passed is greater than or equal to the predetermined duration.

According to another embodiment, a device for providing an authorization message for a user device with regard to an access-restricted service may have: an authorization message creator; and an identifier manager, wherein the authorization message creator is configured to generate an enabling message for enabling a service access authorization or an extending message for extending a service access authorization, the enabling message or the extending message being provided with a service-dependent user identifier provided by the identifier manager; wherein the identifier manager has a first block of associated service-dependent user identifiers in which an authorization time interval of a user device is running, a second block of unused service-dependent user identifiers in which the authorization time interval of the user device has expired by less than the predetermined duration, and a third block of service-dependent user identifiers released for being used again; and wherein the identifier manager is configured to leave a service-dependent user identifier unused for at least a predetermined duration after expiry of an authorization time interval of a user device to which the service-dependent user identifier was associated last, and to release the service-dependent user identifier for being used again by the authorization message creator after expiry of the predetermined duration.

According to still another embodiment, a system for controlling a service access authorization with regard to an access-restricted service may have: a device for providing an authorization message as mentioned above; a first device for controlling a service access authorization as mentioned above; and a second device for controlling a service access authorization as mentioned above, wherein the system is configured to associate a predetermined service-dependent user identifier at first to the first device for controlling a service access authorization, and to associate the predetermined service-dependent user identifier, after being released for being used again, to the second device for controlling a service access authorization, and wherein the system is configured such that the authorization for extending or reactivating the service access authorization using a predetermined service-dependent user identifier is active in at most one of the first device for controlling a service access authorization and the second device for controlling a service access authorization, and wherein the first device for controlling a service access authorization and the second device for controlling a service access authorization are coupled to the device for providing an authorization message so as to receive the authorization message.

According to another embodiment, a method for controlling a service access authorization with regard to an access-restricted service may have the steps of: determining a period of time in which the service access authorization is valid, responsive to an authorization message provided with a service-dependent user identifier; and disabling an authorization of extending or reactivating the service access authorization using the previous service-dependent user identifier when at least a predetermined duration has passed since an end of a last authorization time interval for which there was a service access authorization, wherein the duration having passed is determined, and wherein the authorization for extending or reactivating using the previous service-dependent user identifier is disabled when the duration having passed is greater than or equal to the predetermined duration.

According to still another embodiment, a method for providing an authorization message with regard to an access-restricted service may have the steps of: generating an enabling message for enabling a service access authorization or an extending message for extending a service access authorization, wherein the enabling message or the extending message is provided with a service-dependent user identifier; not using the service-dependent user identifier for at least a predetermined duration after expiry of an authorization time interval of a user device to which the service-dependent user identifier was associated last; and after expiry of the predetermined duration, releasing the service-dependent user identifier for generating a new enabling message or a new extending message.

Another embodiment may have a computer program having program code for executing the above method for controlling a service access authorization with regard to an access-restricted service or the above method for providing an authorization message with regard to an access-restricted service, when the computer program runs on a computer.

Some embodiments of the present invention are based on a device for controlling a service access authorization for a user device with regard to an access-restricted service setting a period of time in which the service access authorization is valid, responsive to an authorization message provided with a service-dependent user identifier, wherein setting may be dependent on a predetermined duration having passed since an end of a last authorization time interval.

Some embodiments are additionally based on a device for providing an authorization message for a user device with regard to an access-restricted service leaving a service-dependent user identifier unused for at least a predetermined duration after the expiry of the authorization time interval of the user device to which the service-dependent user identifier was associated last.

Some embodiments are based on the finding that user identifiers being released again may be allocated again in a controlled manner so as to limit the address space needed, i.e. the number of potential service-dependent user identifiers, also referred to as i, and to ensure, when applicable, optimum group formation for efficient user addressing in the long run. Address space limitation results, for example, in a smaller number of bits which have to be transmitted for providing the service access authorization when the service-dependent user identifiers may, for example, be represented as a sequence of bits. If fewer bits are needed for transmitting service-dependent user identifiers, a message including a service access authorization may be transmitted via a channel of smaller bandwidth, and additionally the subscriber management system needs to reserve a smaller number of data sets for managing the service-dependent user identifiers.

The inventive concept is able to prevent, after re-allocating the user identifiers released, a user, whose user identification is already invalid and who is also referred to as "old user", from being able to access the contents again using his apparatus. In addition, it can be prevented that a user who has extended his subscription but whose peripheral has not yet received the extension message is excluded immediately from further service usage. In other words, the inventive method causes user satisfaction which may usually also be referred to as "good user feeling".

It is to be mentioned here that an apparatus cannot receive an extension message when it remains switched off for a longer period of time or when it is located at a position of insufficient receive quality, such as, for example, when parking the car in an underground car park or when the apparatus is, for example, installed in the vehicle, when going on holiday by car.

Limitations in operational convenience are to be expected for users who have extended their subscriptions but whose apparatuses have not been ready for reception over a very long period of time and thus have not been able to receive extension messages. The apparatus may be excluded from service usage with these users. Then, the user may exemplarily contact his service provider to be provided with a new user identification or to have the disabled parameters and keys for the respective service in his apparatus restored again for his old user identification still registered in the subscriber management system.

BRIEF DESCRIPTION OF THE DRAWINGS

Embodiments of the present invention will be detailed subsequently referring to the appended drawings, in which:

FIG. 6a shows an example of a time line of a service extension, wherein not all the extension messages belonging to the subscription have been received;

FIG. 6b shows another example of a time line of a service extension, wherein there is a period of time in which no extension messages were received, between a first and a second extension message;

FIG. 7a shows an example of a time line of a service extension including an extension message, an apparatus restart time and a life-sustaining period;

FIG. 7b shows an example of a time line of a service extension including a first extension message, a second extension message and a life-sustaining period;

DETAILED DESCRIPTION OF THE INVENTION

Figure 1A:
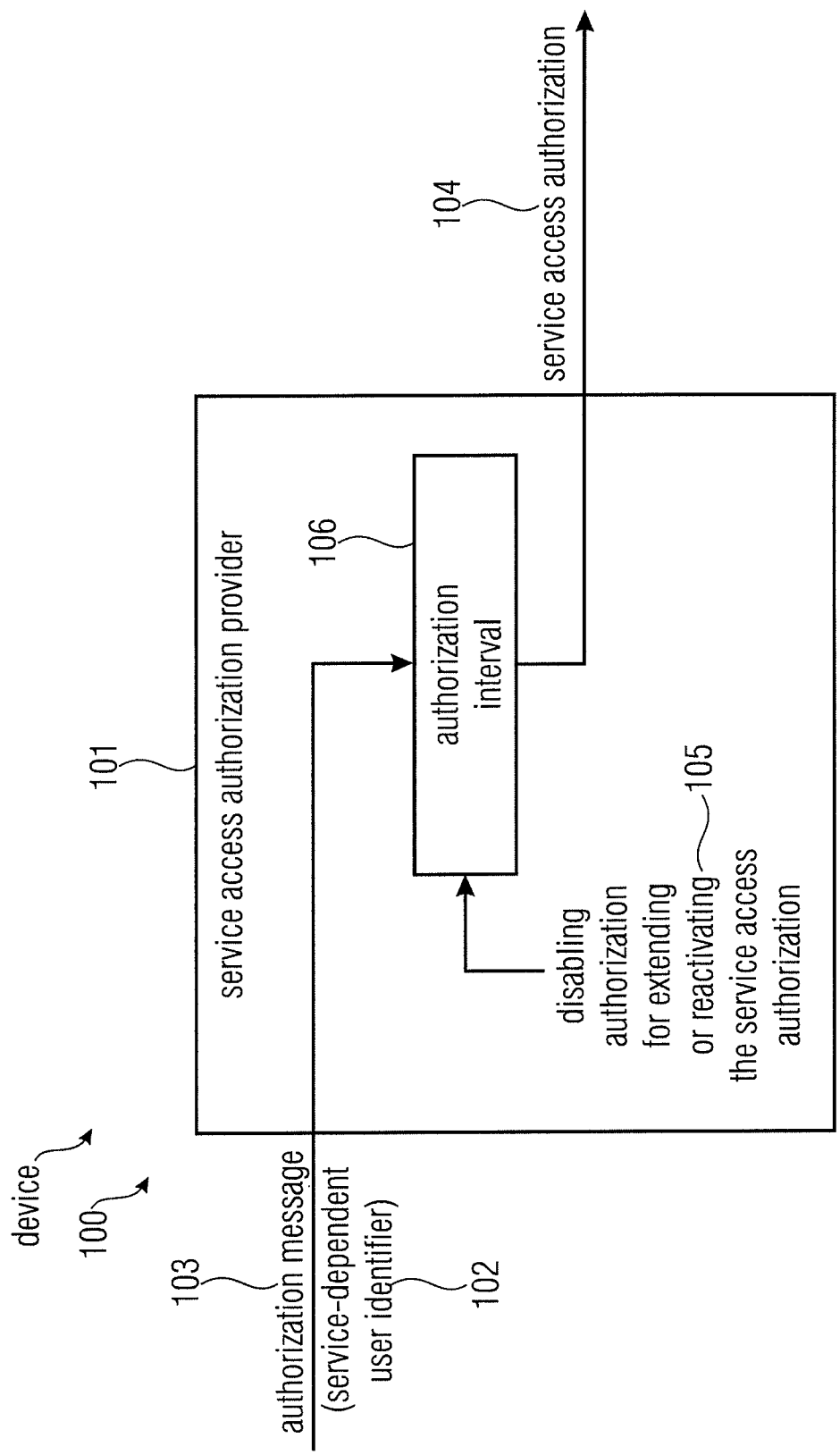
FIG. 1a shows a block circuit diagram of a device for controlling a service access authorization in accordance with an embodiment of the present invention.

FIG. 1a shows a block circuit diagram of a device 100 for controlling a service access authorization for a user device with regard to an access-restricted service in accordance with an embodiment of the present invention. The device 100 includes a service access authorization provider 101, the service access authorization provider 101 being configured to determine a period of time in which the service access authorization 104 is valid, and the determination being responsive to an authorization message 103 provided with a service-dependent user identifier 102. The service access authorization provider 101 is configured to disable 105 an authorization which allows extending or reactivating the service access authorization 104 using the previous service-dependent user identifier 102 when at least a predetermined period of time has passed since an end of the last authorization time interval 106 for which a service access authorization 104 was determined by the device 100. Another embodiment for disabling 105 the authorization which allows extending or reactivating the service access authorization 104 is shown in FIG. 1b.

Figure 1B:
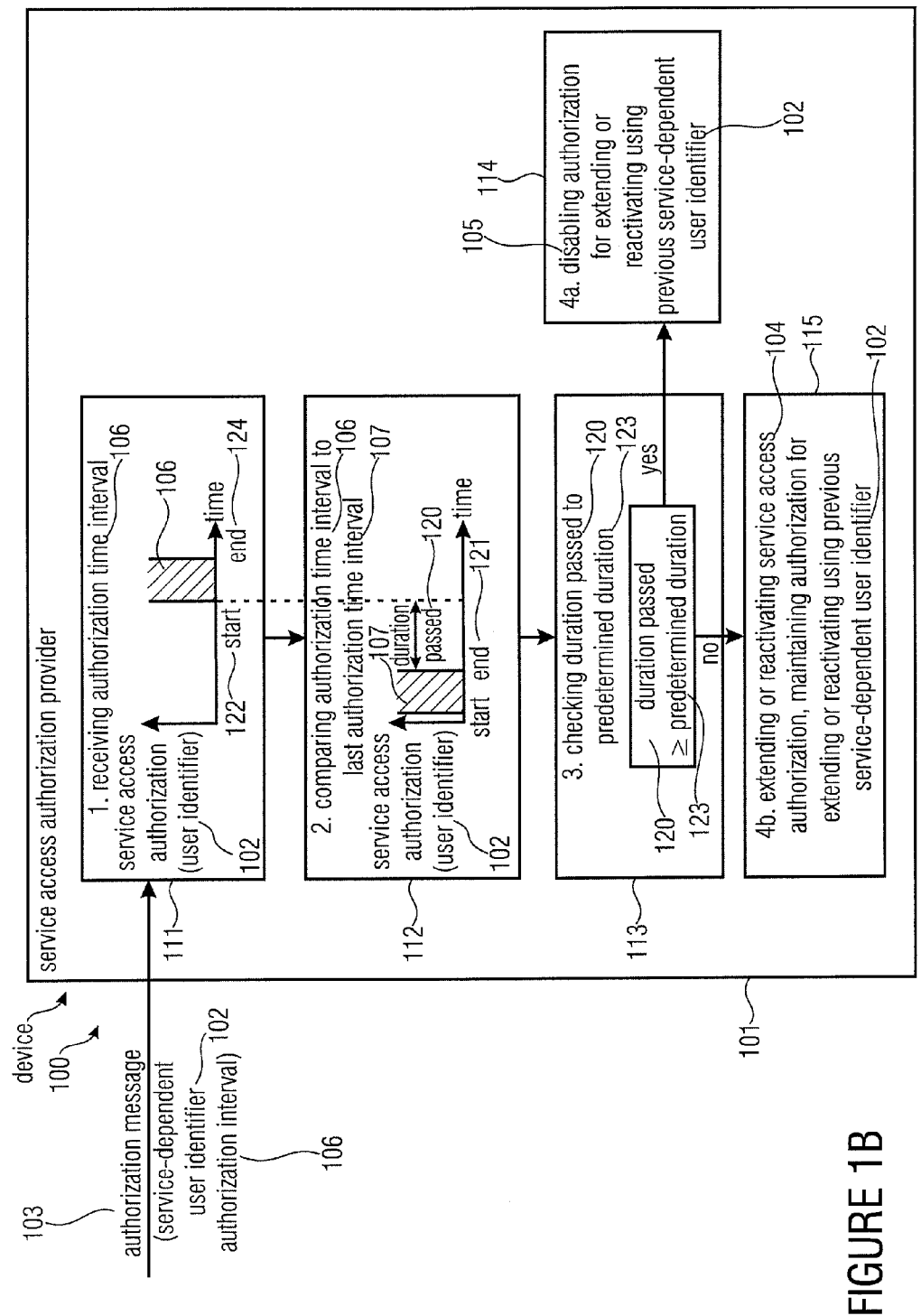
FIG. 1b shows a block circuit diagram of a device for controlling a service access authorization in accordance with another embodiment of the present invention.

FIG. 1b shows a block circuit diagram of a device 100 for controlling a service access authorization for a user device with regard to an access-restricted service in accordance with another embodiment of the present invention. The device 100 includes a service access authorization provider 101 receiving an authorization message 103 which includes a service-dependent user identifier 102 and an authorization time interval 106 or information describing an authorization time interval 106. The following five steps, which are identified by their functional blocks 111, 112, 113, 114 and 115, are performed in the service access authorization provider 101 in dependence on the authorization message 103.

In a first step 111, the service access authorization provider 101 receives the authorization message 103 including the authorization time interval 106.

In a second step 112, the service access authorization provider 101 compares the authorization time interval 106 received to the last authorization time interval 107 present in the device 100. The duration 120 having passed since the end 121 of the last authorization time interval 107 and the start 122 of the authorization time interval 106 received is determined.

In a third step 113, the service access authorization provider 101 compares the duration 120 having passed to the predetermined duration 123. If the duration 120 having passed is greater than or equal to the predetermined duration 123, the service access authorization provider 101 will perform step 4a 114; if, however, the duration 120 having passed is smaller than the predetermined duration 123, the service access authorization provider 101 will perform step 4b 115.

In step 4a 114, the authorization for extending or reactivating using the previous service-dependent user identifier 102 is disabled 105. In step 4b 115, the service access authorization 104 is extended or reactivated and the authorization for extending or reactivating using the previous service-dependent user identifier 102 is maintained.

The decisive parameter determining the behavior of the device 100 is the predetermined duration 123, which is also referred to as the "keep alive period" or KAP. Using this parameter, the device 100 controls whether the authorization for extending or reactivating using the previous service-dependent user identifier 102 is disabled 105 or maintained.

The embodiment of the device 100 for controlling a service access authorization may be employed on most different apparatuses, exemplarily for an audio, video or multimedia service on a pay TV system or a pay video system or on a driving assistance system, wherein the systems may be implemented on a mobile or a fixedly installed apparatus. Furthermore, the device 100 may be used for a data service or multimedia service on a mobile phone or for a chargeable and/or access-controlled service on a portable or stationary computer with or without Internet access.

Determining the duration 120 having passed may be responsive to a time when the device is switched on, instead of the start time 122 of the authorization time interval 106. In this case, the duration 120 having passed is the duration between the end 121 of the last authorization time interval 107 and a time when the device 100 is switched on. This is, for example, the case when the apparatus has been switched off since the end 121 of the last authorization interval 107 and is only switched on at a later time. It may then happen that the apparatus has not received extension messages meanwhile transmitted by the service provider and that the duration 120 having passed in the meantime (since the last extension message received) determines whether the user may keep his service access authorization 104 and/or the authorization for extending the service access authorization using the previous service-dependent user identifier 102.

The service access authorization provider 101 exemplarily receives an authorization message 103 which may include an enabling or extension message and determine from it an authorization time interval 106 having an authorization start time 122 and an authorization end time 124. The service access authorization provider 101 is configured to enable the service access authorization 104 when the authorization end time 124 is temporally after a current time measured in the device 100, i.e. when the service access authorization 104 is valid at the current time.

The authorization message 103 may in another embodiment, apart form the service-dependent user identifier 102 and the authorization time interval 106, also include an apparatus identifier, wherein the service access authorization provider 101 exemplarily, before providing the authorization time interval 106, at first checks the apparatus identifier received in the authorization message 103 and compares same to an apparatus identifier of the peripheral on which the device 100 is implemented, and, if matching, reads the authorization time interval 106 from the authorization message 103.

The service access authorization provider 101 is configured to maintain the authorization allowing extending or reactivating the service access authorization 104 using the previous service-dependent user identifier 102. This is shown in step 4b 115. This means that, after receiving an authorization message 103 and extending and/or reactivating the service access authorization 104, the duration of the authorization for extending or reactivating using the previous service-dependent user identifier 102 extends for the predetermined duration 123 beyond the end of the period of time for which a service access authorization is valid. This predetermined duration 123 is also referred to as the keep alive period or KAP. The predetermined time duration 123 is a characteristic parameter of the device 100.

The service access authorization provider 101 is additionally configured to disable the service access authorization 104 after expiry of the authorization end time 121 when grant of a service access authorization 104 has not been established by the device 100 before or at the authorization end time 121. This means that the service access authorization 104 is disabled at the end 121 of the last authorization time interval 107, even though the authorization for extending or reactivating the service access authorization using the previous service-dependent user identifier 102 is maintained. This authorization for extending or reactivating using the previous service-dependent user identifier 102 is maintained for another duration which corresponds to the predetermined duration 123. Disabling 105 the authorization for extending or reactivating using the previous service-dependent user identifier 102 may exemplarily take place by means of erasing or rendering unreadable or blocking the parameters or keys associated to the service access authorization 104 using the previous service-dependent user identifier 102.

The device 100 including the service access authorization provider 101 may exemplarily be implemented to be an electronic circuit. It may be a computer or part of a computer or a circuit in a mobile phone, a stationary or portable computer, a navigation system, a driving assistance system or a cable or satellite receiver.

Figure 2A:
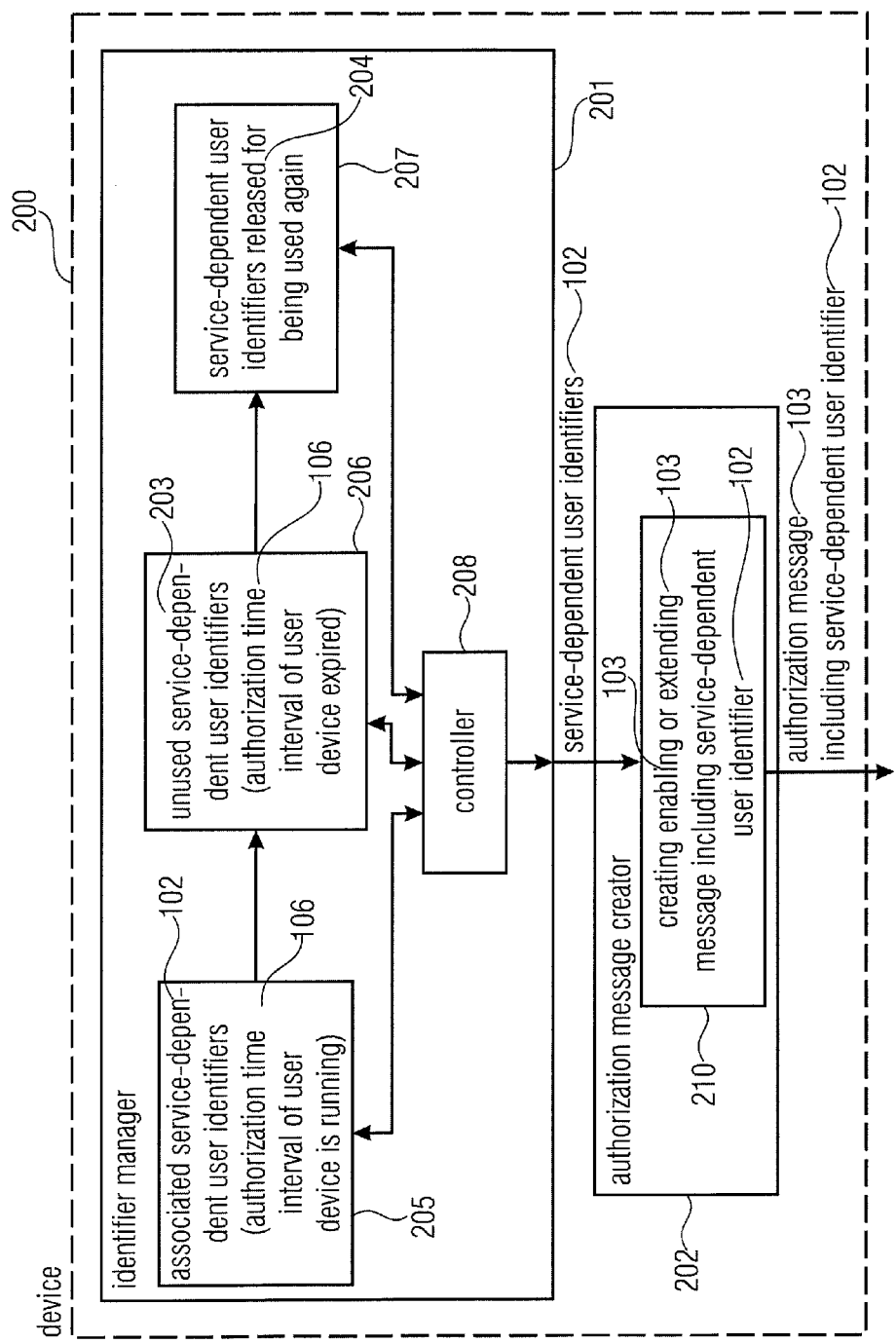
FIG. 2a shows a block circuit diagram of a device for providing an authorization message in accordance with an embodiment of the present invention.

FIG. 2a shows a block circuit diagram of a device 200 for providing an authorization message for a user device with regard to an access-restricted service in accordance with an embodiment of the present invention. The device 200 includes an identifier manager 201 and an authorization message creator 202. The authorization message creator is configured to generate an authorization message 103 in the form of an enabling message for enabling a service access authorization 104 or an extension message for extending a service access authorization 104, the enabling message 103 or the extending message 103 being provided with a service-dependent user identifier 102 provided by the identifier manager 201. The identifier manager 201 is configured to leave a service-dependent user identifier 102 unused 203 for at least a predetermined duration 123 after expiry of an authorization time interval 106 of a user device to which the service-dependent user identifier 102 was last associated, and to release 204 the service-dependent user identifier 102 for being used again by the authorization message creator 202 after expiry of the predetermined duration 123.

The identifier manager 201 exemplarily includes three blocks comprising service-dependent user identifiers: the first block 205 includes associated service-dependent user identifiers 102 in which the authorization time interval 106 of the user device is running, the second block 206 includes unused 203 service-dependent user identifiers 102 in which the authorization time interval 106 of the user device has expired by less than the predetermined duration 123, and the third block 207 includes service-dependent user identifiers 102 released 204 for being used again.

A controller 208 within the identifier manager 201 controls which service-dependent user identifier 102 is to be made available to the authorization message creator 202. The controller 208 here controls providing associated service-dependent user identifiers 102 of block 205 or unused 203 service-dependent user identifiers 102 of block 206 or providing service-dependent user identifiers 102 released 204 for being used again of block 207.

The authorization message creator 202 includes a block 210 for creating an enabling or extending message including the service-dependent user identifier 102 provided by the identifier manager 201. Thus, the device 200 provides an authorization message 103 including a service-dependent user identifier 102.

Figure 2B:
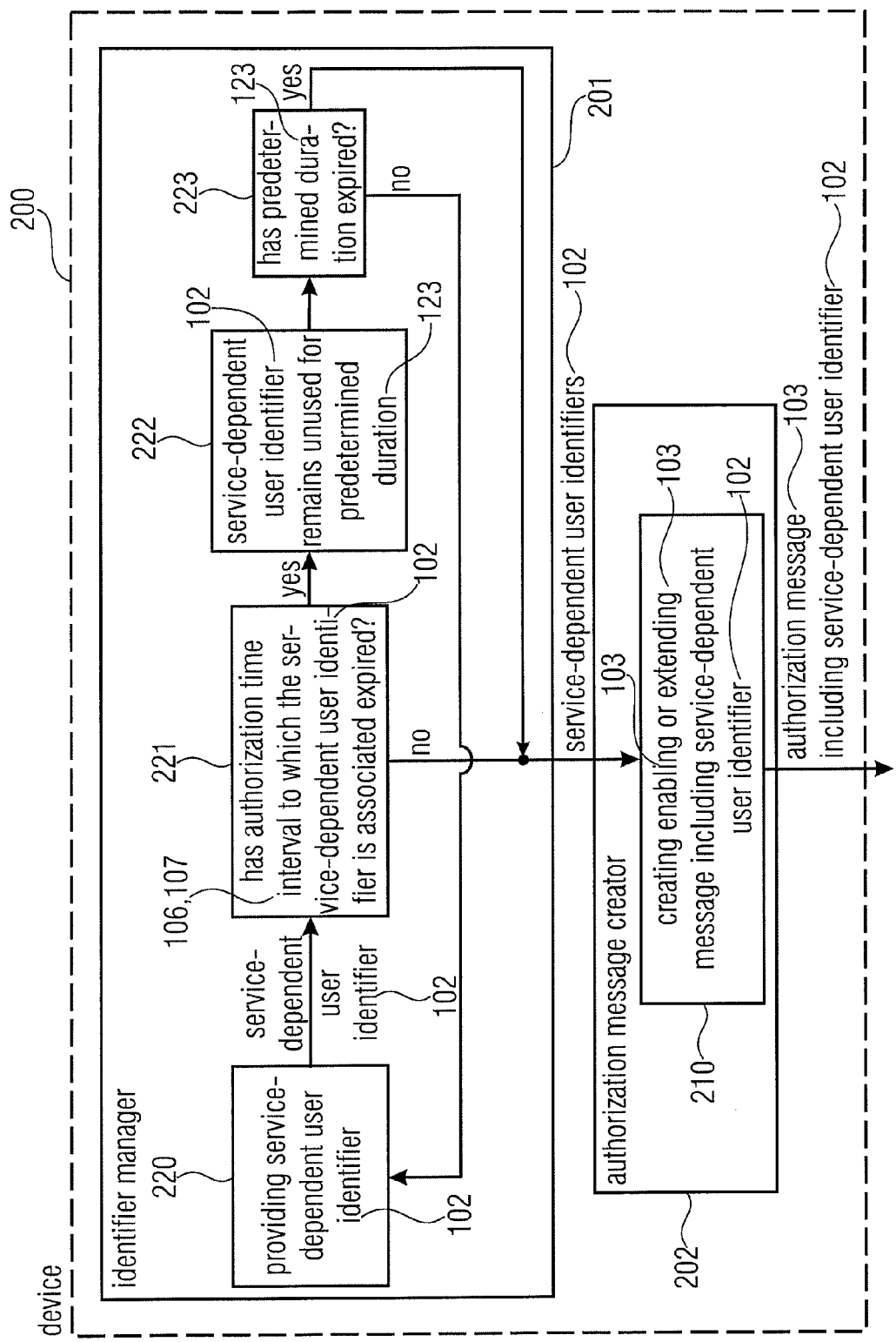
FIG. 2b shows a block circuit diagram of a device for providing an authorization message in accordance with another embodiment of the present invention.

FIG. 2b shows a block circuit diagram of a device 200 for providing an authorization message for a user device with regard to an access-restricted service in accordance with another embodiment of the present invention. The authorization message creator 202 is of the same setup as the authorization message creator 202 in accordance with FIG. 2a. The function of the controller 208 of FIG. 2a will be discussed in greater detail in FIG. 2b using blocks 220, 221, 222 and 223. It is the object of the identifier manager 201 to provide a service-dependent user identifier 102, which is illustrated by block 220. This may alternatively also take place outside the identifier manager 201 or outside the device 200.

Providing includes several functionalities. In block 221, it is checked for a service-dependent user identifier 102 up to then associated to a peripheral whether the authorization time interval 106, 107 to which the service-dependent user identifier 102 is associated has expired. Should the authorization time interval 106, 107 (during which the previous user peripheral has access to a service) have not yet expired, the service-dependent user identifier 102, associated to a peripheral up to then, may be used for creating enabling or extending messages 103 for the previous user and/or the previous peripheral. If, however, the authorization time interval 106, 107 has expired, the service-dependent user identifier 102 will remain unused for a predetermined duration 123, which is indicated in block 222. The service-dependent user identifier 102 may, before expiry of the predetermined duration 123 since the end 121 of the authorization time interval 107, be used to renew the authorization time interval for the previous peripheral.

In block 223, it is finally checked whether the predetermined duration 123 has expired. Should the predetermined duration 123 have expired, the service-dependent user identifier 102 may be used again, wherein then a new user may obtain an authorization message 103 including the service-dependent user identifier 102 which was associated before to a different user. If the predetermined duration 123 has not yet expired, the service-dependent user identifier 102 cannot be released for a different user and/or a different peripheral. The identifier manager 201 then provides, for the other peripheral, another service-dependent user identifier 102 which may exemplarily be checked in blocks 221, 222 and 223 as to its usability, and is provided to the authorization message creator 202 when usable, so that same can create an authorization message 103 including the other service-dependent user identifier 102.

The authorization message creator 202 may be configured to create a message 103 for enabling or extending an audio, video or multimedia service, for example, for a pay TV system or a driving assistance system on a mobile or fixedly installed apparatus or a data service or multimedia service on a mobile phone or an access-controlled and/or chargeable service on a portable or stationary computer with or without Internet access.

The authorization message creator 202 may additionally be configured to create the authorization message 103 including the service-dependent user identifiers 102, wherein the service-dependent user identifiers 102 may exemplarily be represented by a sequence of bits. The authorization message creator 202 may be configured to transmit the authorization message 103 including the service-dependent user identifiers 102 via a message channel of limited bandwidth. Furthermore, the authorization message creator 202 and the identifier manager 201 may exemplarily be implemented as electronic circuits.

Efficient distribution of service access authorization information is caused by the efficient controller 208. This is achieved by releasing again service-dependent user identifiers 102 for being used by another user and/or another user peripheral after a predetermined duration 123 during which they remain unused. This results in a reduction in the number of service-dependent user identifiers 102 needed for identifying a service d on an apparatus g. The authorization message 103 which includes the service-dependent user identifiers 102 may due to the reduced number of bits of the service-dependent user identifiers 102 be transmitted at reduced bandwidth. In addition, less memory space is needed for storing the user data on a subscriber management system.

The identifier manager 201 is additionally configured to release the service-dependent user identifier 102, after expiry of the predetermined duration 123, for being used again by another user or another peripheral. After expiry of a subscription of a previous user of the user device to which the service-dependent user identifier 102 was last associated, the service-dependent user identifier 102 may, after expiry of the predetermined duration 123, be used again for a new subscription of another user or the same user. The predetermined duration 123 may exemplarily include a value in the range of three days to three months, i.e. the predetermined duration may be adjusted to authorization time intervals as they typically occur in pay TV or subscription services in the field of mobile telephony, navigation systems, driving assistance systems or chargeable Internet services. The authorization message 103 may exemplarily be directed to several receivers. The transmission may exemplarily be on a system which is typically referred to as a "broadcast system". However, it is also possible to provide the authorization message 103 to a group of users or to transfer same to only one single user.

The enabling or extending message 103 may also be of a personalized form of such a type that the service-dependent user identifier 102 is dependent on the apparatus identification on the apparatus on which the service runs and on a service identification. Furthermore, the enabling or extending message 103 may be grouped in such a manner that messages 103 to users of the same authorization time interval 106 are united in a group. This allows achieving a clear representation in the subscriber management system, wherein users whose subscriptions have to be extended at the same times receive an extending message 103 at the same time, wherein the extending message 103 then only needs to be sent to those users needing an extension. Using grouping, it is easily possible to keep managing the extending messages 103 in the subscriber management system at a clear level and to avoid unnecessary extending messages 103.

The authorization time interval 106 may be specified using a start time 122 and an end time 124 or also using the start time 122 and the duration. However, other possibilities are also feasible.

Figure 3:
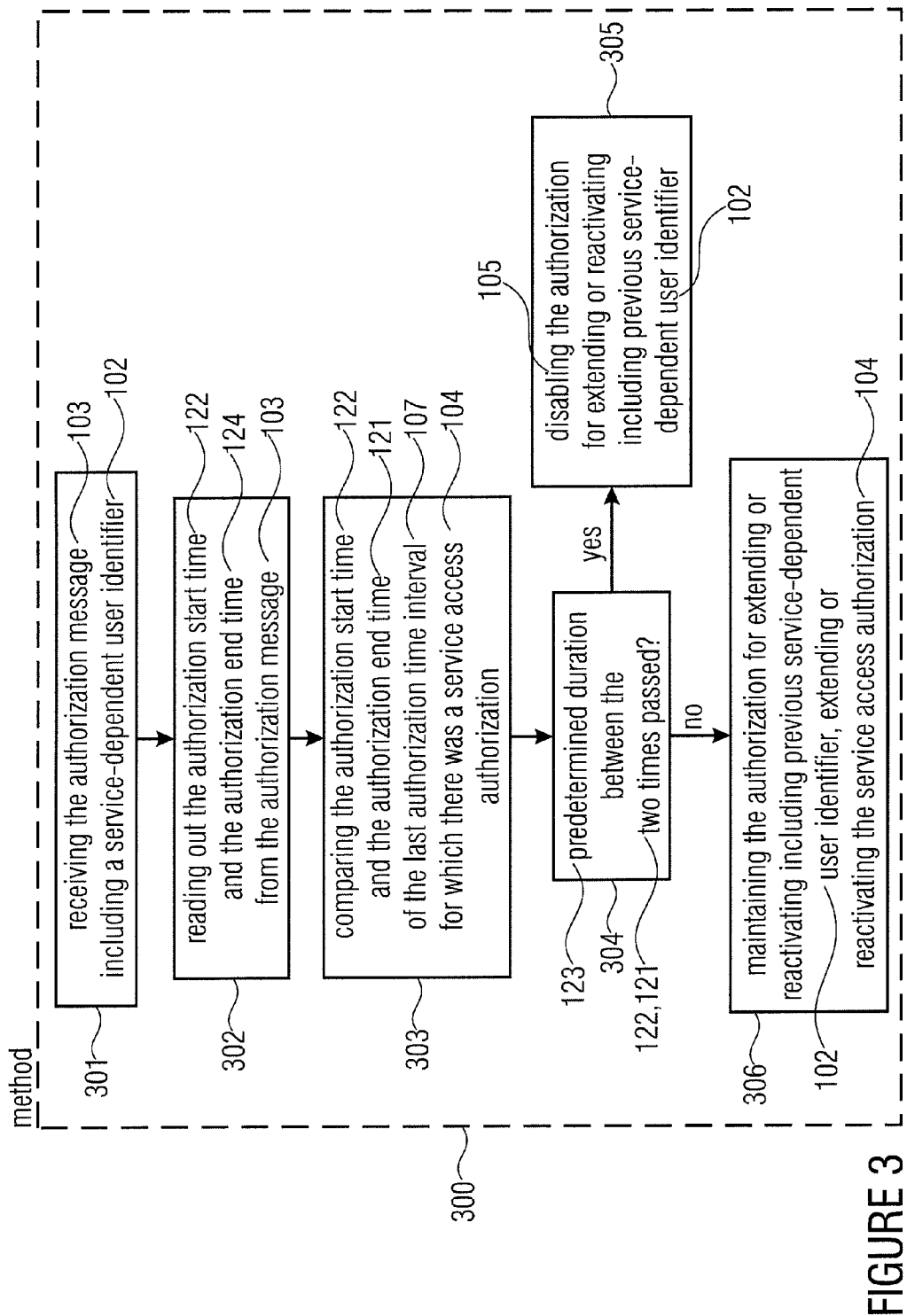
FIG. 3 shows an embodiment in the form of a flowchart of a method for controlling a service access authorization.

FIG. 3 shows an example in the form of a flowchart of a method for controlling a service access authorization with regard to an access-restricted service. The method 300 comprises steps 301, 302, 303, 304, 305 and 306.

In the first step 301, an authorization message 103 including a service-dependent user identifier 102 can be received. What follows is the second step 302 in which the authorization start time 122 and the authorization end time 124 can be read out from the authorization message 103. What follows is the third step 303 in which the authorization start time 122 can be compared to the authorization end time 121 of the last authorization time interval 107 for which there was a service access authorization 104. In a subsequent fourth step 304 it can be checked whether a predetermined duration 123 has passed between the authorization start time 122 and the authorization end time 121 of the last authorization time interval 107 or between the authorization end time 121 and a current time has passed. If the predetermined duration 123, the fifth step 305 can be performed in which the authorization for extending or reactivating using the previous service-dependent user identifier 102 can be disabled 105. If the predetermined duration 123 has not passed, in the sixth step 306, the authorization for extending or reactivating using the previous service-dependent user identifier 102 can be maintained and the service access authorization 104 can be extended or reactivated.

Figure 4:
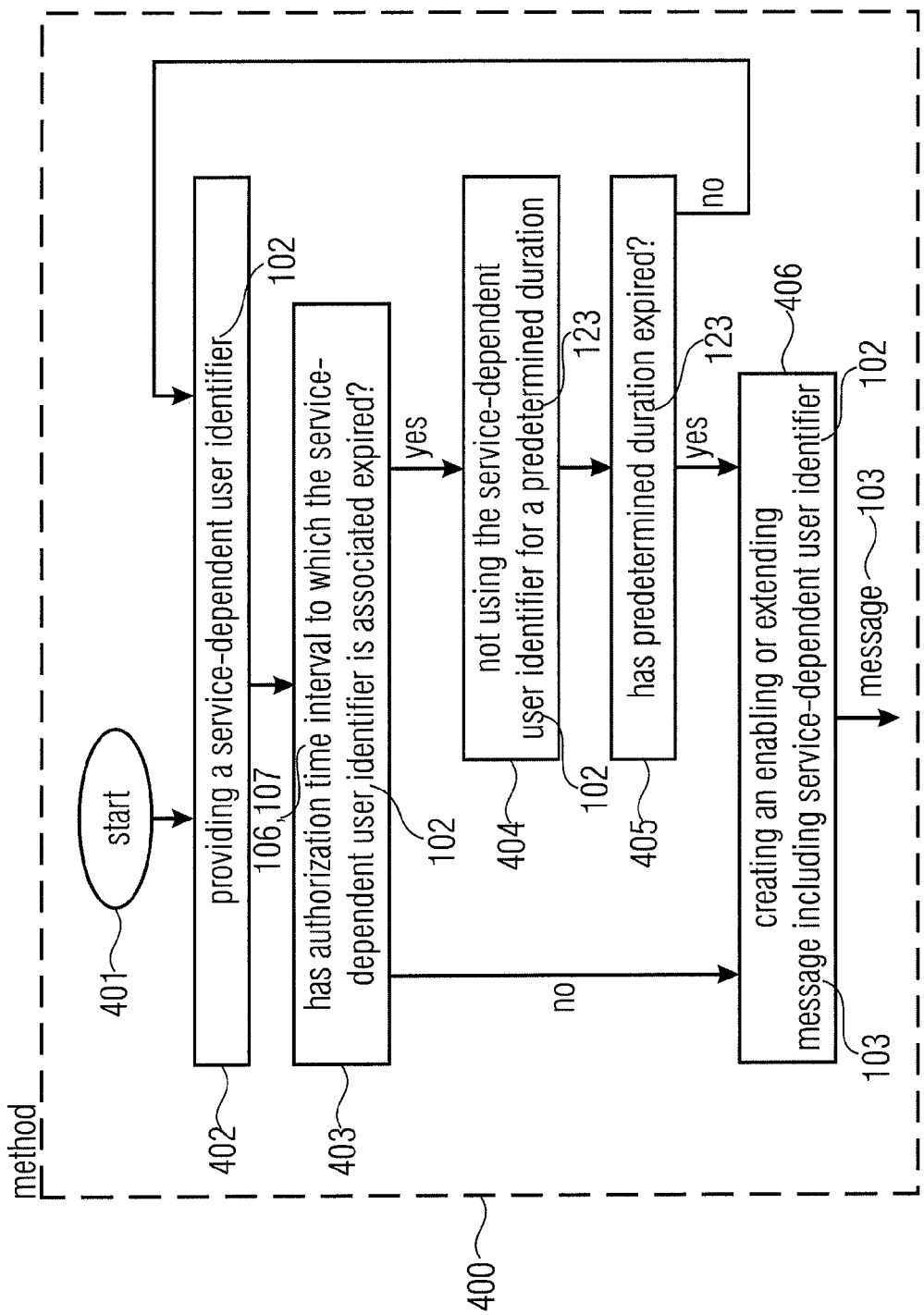
FIG. 4 shows an embodiment in the form of a flowchart of a method for providing an authorization message.

FIG. 4 shows an example in the form of a flowchart of a method 400 for providing an authorization message with regard to an access-restricted service. After starting 401 the method 400, in a first step 402, a potential service-dependent user identifier 102 can be provided, wherein it is subsequently checked whether the potential service-dependent user identifier 102 is actually to be used. In a second step 403, it can be checked whether an authorization time interval 106, 107 of a peripheral to which the service-dependent user identifier 102 is associated has expired. If this is the case, in a third step 404, it can be ordered or determined not to use the service-dependent user identifier 102 for a predetermined duration 123 and/or not to use same for a peripheral other than that to which the service-dependent user identifier has been associated so far. In a fourth step 405, it can be checked whether the predetermined duration 123 has expired. If the predetermined duration 123 has not expired, the method 400 can jump back to the first step 402 in which a service-dependent user identifier 102 can be provided, wherein this time a different service-dependent user identifier than in the previous check should be provided. If the duration 123 predetermined in the fourth step 405 has expired, in a fifth step 406, an enabling or extending message 103 including the service-dependent user identifier 102 can be created and this message 103 be provided.

The same fifth step 406 can be performed in the case that, in the second step 403, the authorization time interval 106, 107 of the peripheral to which the service-dependent user identifier 102 is associated has not yet expired. Even for this case an enabling or extending message 103 can be created in the fifth step 406, including the service-dependent user identifier 102. The difference between the transition from the second step 403 to the fifth step 406 and the transition from the fourth step 405 to the fifth step 406 is that in the first case the enabling or extending message 103 including the service-dependent user identifier 102 is provided to the previous user, whereas in the latter case the enabling or extending message 103 including the service-dependent user identifier 102 is provided to a new user which, however, may also include the previous user.

Figure 5:
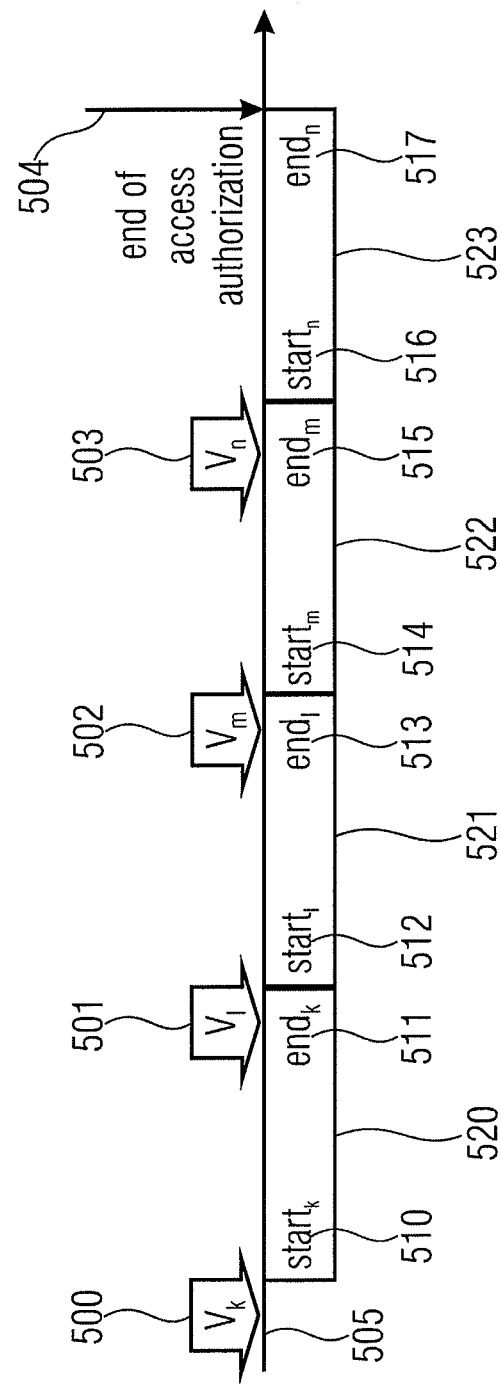
FIG. 5 shows an example of a time line of a service extension by means of extension messages.

FIG. 5 shows an example of a time line of a service extension by means of extending messages and represents the course of a service extension by means of the extending messages $V_k$ 500, $V_l$ 501, $V_m$ 502 and $V_n$ 503. The end of the access authorization 504 is indicated by the time $end_n$ 517. A service for which there is an access authorization can be extended using extending messages. In this embodiment, a service user receives an extending message $V_k$ 500 at a time 505, wherein the extending message $V_k$ 500 includes two parameters of an access authorization interval, namely $start_k$ 510 and $end_k$ 511, indicating which period of time the extension of the service access authorization includes.

If the service user has, for example, initiated or applied for (such as, e.g., by payment) an extension of his service access authorization beyond the time $end_k$ 511, he can receive, within a period shortly before the $end_k$ 511, an extending message $V_l$ 501 which extends his access authorization by a period which is indicated in the extending message $V_l$ 501 by means of the parameters $start_l$ 512 and $end_l$ 513. The extending message $V_l$ 501 may be transmitted repeatedly by the service provider shortly before the end of the respective subscription and allows the service user to extend his service access authorization. Since it is possible for the service user not to have his apparatus always switched on or for him to be located at a position of poor receive quality, the extending message $V_l$ 501 may exemplarily be transmitted several times one after the other at times shortly before the end of the respective subscription, i.e. $end_k$.

If the service user has exemplarily extended his access authorization up to the time $end_l$ 513 and also extended his subscription, the service provider can transmit, shortly before the end of the time $end_l$ 513, to him an extending message $V_m$ 502 using which the service user can extend his service access authorization from the time $start_m$ 514 up to the time $end_m$ 515. When the subscription continues to be valid, the service provider can transmit another extending message $V_n$ 503, exemplarily shortly before the time $end_m$ 515, so that the service user can extend his service access authorization for the time interval $start_n$ 516 to $end_n$ 517. When, for example, the subscription ends, as is shown in FIG. 5, at the time $end_n$ 517, which here coincides with the end of the access authorization 504, the service provider will exemplarily not transmit further extending messages to the service user and the service access authorization of the service user expires. In FIG. 5, the respective service access authorization intervals 520, 521, 522 and 523 are exemplarily successive in time. However, this need not necessarily be the case. Exemplarily, a small period of time may be between the time interval 521 and the time interval 520, during which the service user has no service access authorization, for example when not having extended his subscription in due time, and an extending message 501 is only transmitted to him after the time $end_k$ 501 of the first authorization interval 520. However, FIG. 5 also shows that a service access authorization of a service user may be dependent on a message being transmitted to him by the service provider, and that the service user, for extending his service access authorization, may be dependent on receiving an extending message 500, 501, 502, 503 from the service provider. Maintaining his service access authorization will, for example, not be possible for the service user without same.

FIG. 6a shows a similar example of a time line of a service extension, not all of the extending messages belonging to the subscription having been received here. In contrast to FIG. 5, the extending messages $V_l$ 501 and $V_l$ 502 have not been received. The consequence is that there is no service access authorization for the user for the authorization time interval 521, i.e. from $start_l$ 512 to $end_l$ 513, and for the authorization time interval 522, i.e. from $start_m$ 514 to $end_m$ 515. The predetermined duration 123 is indicated in FIG. 6a and is referred to as KAP 600 or keep alive period, the predetermined duration 123 corresponding to KAP 600.

FIG. 6a shows the case in which the authorization start time 122 and 516 is temporally before the authorization end time 121 and 511, respectively, of the last authorization time interval 107 and 520, respectively extended by the predetermined duration 123 and 600, respectively. Thus, the authorization for extending or reactivating the service access authorization including the previous service-dependent user identifier 102 may be maintained and the service access authorization 104 may be extended or reactivated at the time $start_n$ 516. This can be recognized in FIG. 6a by the fact that the time $end_k$ 511 which represents the authorization end time of the authorization interval 520 of the extending message $V_k$ 500, extended by the predetermined duration KAP 600, results in a time which is temporally after the authorization start time $start_n$ 516 of the authorization time interval 523 of the extending message $V_n$ 503. The service user may maintain his previous service-dependent user identifier 102 and extend or reactivate the service access authorization.

FIG. 6b shows an alternative embodiment of the time line of a service extension compared to FIG. 6a. Whereas in FIG. 6a the two extending messages $V_l$ 501 and $V_m$ 502 have been identified as not received, they are not indicated in FIG. 6b, i.e. even several extending messages may exemplarily not have been received between $V_k$ 500 and $V_n$ 503. In FIG. 6b, a keep alive period, or KAP, is specified which corresponds to the predetermined duration 123. This keep alive period KAP is known to both the subscriber management system and to the peripheral. It may either be communicated when enabling the service or be a fixed quantity or be determinable from known parameters.

When a user subscription has expired, the end of a keep alive period is, for example, waited for before the corresponding user identification may be used again by the subscriber management system for a new subscription (such as, for example, for a user or peripheral other than the previous one).

When restarting an apparatus, as is explained in greater detail in FIG. 7a, or when receiving an extending message $V_n$ 503 based on an authorization interval 523 which is specified by an authorization start time, "$start_n$", and an authorization end time, "$end_n$", the peripheral can check whether the keep alive period, i.e. KAP, has expired. The keep alive period, i.e. KAP 600, may be added here to the end $end_k$ 511 of the last stored authorization time interval 520.

Should the sum of $end_k$ 511 and KAP 600 be temporally after the restart of the apparatus (or the time when the apparatus is restarted) and/or the authorization start time $start_n$ of the current authorization time interval 523 of the extending message $V_n$ 503, the keep alive period KAP 600 has not yet expired. Extending messages $V_l$ 501 and $V_m$ 502 lying in between may not have been received for one of the reasons mentioned before. The peripheral may perform an extension. The user identification has not yet been allocated again by the subscriber management system. The extending message is directed to the previous user.

The example of FIG. 6b shows extending messages $V_k$ 500 and $V_n$ 503 received; at the time $start_n$ 516, the keep alive period KAP 600 has not yet expired, i.e. expressed as a formula: ($end_k$+KAP<$start_n$). The access authorization may be extended.

A user having extended his subscription, but whose peripheral could not receive the extending message, can be prevented from being excluded immediately from further service usage, i.e. user satisfaction is ensured, which is usually referred to as good user feeling.

FIG. 7a shows an example of a time line of a service extension including an extending message $V_k$ 500, an apparatus restart time, referred to here as T 700, and a keep alive period KAP 600 which puts the authorization end time $end_k$ 511 of the authorization time interval 520 of the extending message $V_k$ 500 in context with the time T 700 of the apparatus restart. It can be seen in this embodiment that, after the end $end_k$ 511 of the authorization time interval 520 to the apparatus restart T 700, a longer duration has already passed than is provided for by the keep alive period KAP 600. Apparatus restart T 700 here exemplarily means the time when the device 100 is switched on. Since a longer time has already passed up to the time T 700 than is provided for by KAP 600, the peripheral has to disable 105 its authorization for extending or reactivating including the previous service-dependent user identifier 102. It can be assumed that a service access authorization 104 including the previous service-dependent user identifier 102 has already been allocated to another user.

If, as is shown in FIG. 7a, the sum of the authorization end time $end_k$ 511 of the last authorization time interval 520 received and the keep alive period KAP 600 results in a time which is temporally before the time of switching on the apparatus 100 or the apparatus restart time T 700, the keep alive period KAP 600 has already expired. The peripheral should disable in a secure manner its parameters and keys stored in connection with this service. The user identification may already have been allocated to another user by the subscriber management system.

In the example in accordance with FIG. 7a, a received extending message $end_k$ 500 is illustrated; at the time of the apparatus restart T 700, the "keep alive period" KAP 600 has already expired, which may be expressed using the following formula ($end_k$+KAP<T). The service parameters are disabled.

FIG. 7b shows an example of a time line of a service extension including two extending messages $V_k$ 500 and $V_n$ 503 and their relation to the keep alive period KAP 600. In FIG. 7b, when the extending message $V_n$ 503 including the respective authorization start time $start_n$ 516 arrives, the keep alive period KAP 600 which began with the end $end_k$ of the last authorization time interval 520 of the extending message $V_k$ 500 has already expired. In this case, too, the peripheral should disable 105 its authorization for extending or reactivating including the previous service-dependent user identifier 102.

If, as is shown in FIG. 7b, when an extending message $V_n$ 503 arrives, the sum of the authorization end time $end_k$ 511 of the last received authorization time interval 520 and the keep alive period KAP 600 results in a time which is temporally before the authorization start time $start_n$ 516 of the current extending message $V_n$ 503 that has arrived (or temporally before the arrival of the extending message $V_n$ 503), the keep alive period KAP 600 has already expired. The peripheral should then disable in a secure manner its parameters and/or keys stored in connection with this service. This may exemplarily be about an extending message which has already been directed to a new user. The user identification 102 may also have been newly allocated to another user by the subscriber management system. This is illustrated in FIG. 7b. Received extending messages $V_k$ 500 and $V_n$ 503 indicate that, at the time $start_n$ 516, the keep alive period KAP 600 has already expired, which may be expressed by a formula ($end_k$+KAP<$start_n$). The access authorization is not extended.

Thus, the user whose identification 102 is already invalid, i.e. the user also referred to as old user, can be prevented from accessing the contents again using his apparatus after the released user identification 102 has been newly allocated.

However, what cannot be prevented is the fact that this may be about a user who has extended his subscription, but whose apparatus has not been ready to receive over a very long period of time, and who has consequently been excluded from service usage. This user should get in touch with his service provider in order to be provided with a new user identification 102, for example, or to have the disabled parameters and keys for the respective service in his apparatus restored again for his old user identification 102 still registered in the subscriber management system.

The method described here of re-allocating user identifications 102 has a regulating effect on how released user identifications 102 can be allocated again. This allows limiting the address space needed and ensures optimum group formation in the long run. This function has not been described in common digital rights management systems and access authorization systems, such as, for example, CA or DRM systems, but may be applied in most different systems, on the server or client side, i.e. by a control computer or by a computer to be controlled.

The method presented needs a peripheral operating in conformity with regulations and a subscriber management system operating in conformity with regulations to be present. The concept does not result in limitations of common business models. It has been developed due to current requirements and represents a reliable solution.

Figure 8:
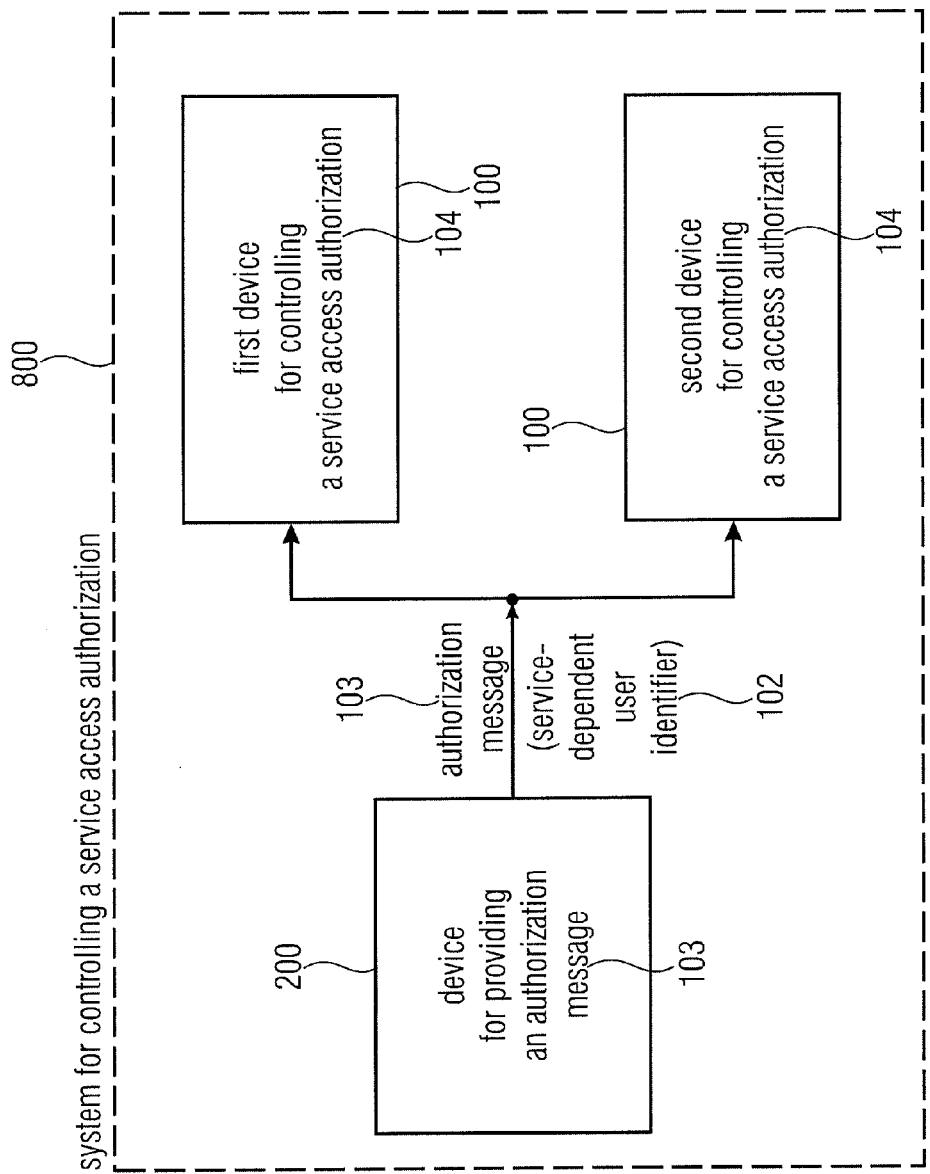
FIG. 8 shows an embodiment in the form of a block diagram of a system for controlling a service access authorization.

FIG. 8 shows an embodiment of a system 800 for controlling a service access authorization in the form of a block diagram. The system includes a device 200 for providing an authorization message, a first device 100 for controlling a service access authorization 104, and a second device 100 for controlling a service access authorization 104.

The system 800 is configured to at first allocate a predetermined service-dependent user identifier 102 to the first device 100 for controlling a service access authorization 104 and to allocate the predetermined service-dependent user identifier 102, after becoming vacant for use again, to the second device 100 for controlling a service access authorization 104. Furthermore, the system is configured such that the authorization for extending or reactivating the service access authorization 104 using a predetermined service-dependent user identifier 102 is active in at most one of the first device 100 for controlling a service access authorization 104 and the second device 100 for controlling a service access authorization 104, wherein the first device 100 for controlling a service access authorization 104 and the second device 100 for controlling a service access authorization 104 are coupled to the device 200 for providing an authorization message 103 so as to receive the authorization message 103.

The system 800 may exemplarily be configured to transmit the authorization message 103 via a digital video or audio broadcast system, a mobile radio system, a line-switched or package-switched voice or data network or via an Internet protocol system, a GSM, UMTS or CDMA system, a GPS system or a DSL system in a conducted manner or wirelessly. The system 800 may also include several devices 100 for controlling a service access authorization 104. It may exemplarily be configured to be a system of electronic circuits and the authorization message 103 may be a data message which may be transmitted from the device 200 for providing an authorization message 103 to the first device 100 for controlling a service access authorization 104, to the second device 100 for controlling a service access authorization 104 and to other devices 100 for controlling a service access authorization present.

The service-dependent user identifier 102 may be represented by a sequence of bits, wherein the range of values of the service-dependent user identifier 102 exemplarily includes a range smaller than the product of the number of registered users in the system 800 and the number of registered services in the system 800. This may indicate that, without re-using the service-dependent user identifier 102, a number of service-dependent user identifiers 102 which corresponds to the number of registered services in the system 800, i.e. the number of services which the user may make use of, is to be kept exemplarily for every user including a user device. When utilizing the system 800 completely, as many service-dependent user identifiers 102 may be allocated to each user as there are services registered. The inventive idea of re-using the service-dependent user identifier 102 allows not having to keep the maximum number of all potential combinations, but a smaller number being sufficient.

The predetermined duration 123 or the keep alive period KAP 600 represents an important parameter of the inventive method and of the system 800. Exemplarily, the KAP 600 may be predetermined in the device 200 for providing an authorization message 103 and, when enabling a service, be transmitted to the first device 100 and to the second device 100. The KAP 600, however, may also be considered to be a fixed quantity of the system 800 or be determinable from known parameters of the system 800. Alternatively, a system 800 in which the KAP 600 is predetermined in one of the devices 100 and, from there, transmitted to the other devices 100 and the device 200, is also feasible. The system 800 may also be configured to allocate the service-dependent user identifier 102 temporarily and to block same for the user of the user device to which the service-dependent user identifier 102 was allocated to last after expiry of the service access authorization 104 to the expiry of the predetermined time 123. Thus, the system 800 can prevent a user having an expired service access authorization 104 from being able to access, using access data still present, the service access authorization 104 of another user including the same service-dependent user identifier 102 which has meanwhile been allocated again.

In one embodiment, the system 800 may be a cryptographic system which is able to transmit the authorization message 103 in an encrypted or partly encrypted manner exemplarily using a symmetrical cryptographic key using, for example, an AES encryption algorithm, which is also referred to as advanced encryption standard, or using a DES encryption algorithm, also referred to as data encryption standard. The system 800 may be a digital rights management system, exemplarily in accordance with one of the OMA DRM, ETSI-EUROCRYPT or ISMA standards, wherein the designations of the standards have already been mentioned above.

The system 800 for controlling a service access authorization can couple the device 200 to the first device 100 and to the second device 100. Coupling may take place via a computer network, exemplarily via Ethernet or IP protocols, wherein the network may be realized in a wire-based or wireless manner. Exemplarily, coupling may take place via a cable network of a cable operator, a radio relay system, a satellite radio system, a mobile radio system, such as, for example a GSM system of a UMTS system or a CDMA system or a time-multiplex system. Coupling may be effected via an LAN network, MAN network, WLAN network or via an optical transmission network. Additionally, coupling may be effected via the power supply network, also referred to as powerline transmission, and via an ATM network or by means of a DSL method.

The concept may be employed in access authorization systems, or conditional access systems, or in digital rights management or DRM systems, both on the server side and the client side, wherein server side refers to the side of the control computer and client side refers to the side of the controlled computer. In the embodiment in accordance with FIG. 8, the device 200 may, for example, be considered to be on the server side, i.e. on the control computer side, and the first device 100 for controlling a service access authorization 104 and the second device 100 to be on the client side, i.e. belong to the side to be controlled.

Depending on the circumstances, the inventive method may be implemented in either hardware or software. The implementation may be on a digital storage medium, in particular on a disc or a CD, using control signals which may be read out electronically which are able to cooperate with a programmable computer system such that the respective method will be executed. Generally, the invention is also in a computer program product comprising program code, stored on a machine-readable carrier, for performing the inventive method when the computer program product runs on a computer. In other words, the invention may also be realized as a computer program comprising program code for performing the method when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device for providing an authorization message for a user device with regard to an access-restricted service, comprising:
an authorization message creator; and
an identifier manager,
wherein the authorization message creator is configured to generate an enabling message for enabling a service access authorization or an extending message for extending a service access authorization, the enabling message or the extending message being provided with a service-dependent user identifier provided by the identifier manager;
wherein the identifier manager comprises a first block of associated service-dependent user identifiers in which an authorization time interval of a user device is running,
a second block of unused service-dependent user identifiers in which the authorization time interval of the user device has expired by less than the predetermined duration, and
a third block of service-dependent user identifiers released for being used again;
and wherein the identifier manager is configured to leave a service-dependent user identifier unused for at least a predetermined duration after expiry of an authorization time interval of a user device to which the service-dependent user identifier was associated last, and to release the service-dependent user identifier for being used again by the authorization message creator after expiry of the predetermined duration.

2. The device in accordance with claim 1, wherein the authorization message creator is configured to create a message for enabling or extending an audio service, video service, multimedia service or data service for a pay video system or for a driving assistance system on a mobile or fixedly installed apparatus or for a data service on a mobile phone or for a chargeable and/or access-restricted service on a portable or stationary computer with or without Internet access.

3. The device in accordance with claim 1, wherein the authorization message creator is configured to create the authorization message comprising one or several service-dependent user identifiers, wherein the service-dependent user identifiers are represented by a sequence of bits, and wherein the authorization message creator is implemented to be an electronic circuit, and wherein the authorization message creator is configured to transmit the message comprising the service-dependent user identifier via a message channel of limited bandwidth, and wherein the identifier manager is implemented to be an electronic circuit.

4. The device in accordance with claim 1, wherein the identifier manager is configured to release the service-dependent user identifier for being used again by another user or another peripheral after expiry of the predetermined duration.

5. The device in accordance with claim 1, wherein the identifier manager is configured to use, after a subscription of a user of a user device to which the service-dependent user identifier was associated last has ended, the service-dependent user identifier again for a new subscription of another user or the same user after expiry of the predetermined duration since the subscription has ended.

6. The device in accordance with claim 1, wherein the identifier manager is configured to allocate a value in the range of three days to three months to the predetermined duration.

7. The device in accordance with claim 1, wherein the authorization message creator is configured to generate a message directed to a plurality of receivers.

8. The device in accordance with claim 1, wherein the authorization message creator is configured to personalize the enabling message or extending message such that the service-dependent user identifier depends on the apparatus identification of the apparatus on which the service runs and on a service identification, and wherein the authorization message creator is configured to group several enabling messages or extending messages in a manner such that messages to users comprising the same authorization time interval are united in one group.

9. The device in accordance with claim 1, wherein the authorization time interval is specified by means of a start time and an end time or is specified by means of a start time and a duration.

10. A system for controlling a service access authorization with regard to an access-restricted service, comprising:
a device for providing an authorization message for a user device with regard to an access-restricted service, comprising: an authorization message creator; and an identifier manager, wherein the authorization message creator is configured to generate an enabling message for enabling a service access authorization or an extending message for extending a service access authorization, the enabling message or the extending message being provided with a service-dependent user identifier provided by the identifier manager; wherein the identifier manager comprises a first block of associated service-dependent user identifiers in which an authorization time interval of a user device is running, a second block of unused service-dependent user identifiers in which the authorization time interval of the user device has expired by less than the predetermined duration, and a third block of service-dependent user identifiers released for being used again; and wherein the identifier manager is configured to leave a service-dependent user identifier unused for at least a predetermined duration after expiry of an authorization time interval of a user device to which the service-dependent user identifier was associated last, and to release the service-dependent user identifier for being used again by the authorization message creator after expiry of the predetermined duration;
a first device for controlling a service access authorization for a user device with regard to an access-restricted service, comprising: a service access authorization provider, the service access authorization provider being configured to set a period of time in which the service access authorization is valid, responsive to an authorization message provided with a service-dependent user identifier, and the service access authorization provider being configured to disable an authorization allowing the service access authorization to be extended or reactivated using the previous service-dependent user identifier depending on whether at least a predetermined duration has passed since an end of a last authorization time interval for which a service access authorization was determined by the device, wherein the service access authorization provider is configured to determine the duration having passed and to compare same to the predetermined duration, and to disable the authorization for extending or reactivating using the previous service-dependent user identifier when the duration having passed is greater than or equal to the predetermined duration; and a second device for controlling a service access authorization for a user device with regard to an access-restricted service, comprising: a service access authorization provider, the service access authorization provider being configured to set a period of time in which the service access authorization is valid, responsive to an authorization message provided with a service-dependent user identifier, and the service access authorization provider being configured to disable an authorization allowing the service access authorization to be extended or reactivated using the previous service-dependent user identifier depending on whether at least a predetermined duration has passed since an end of a last authorization time interval for which a service access authorization was determined by the device, wherein the service access authorization provider is configured to determine the duration having passed and to compare same to the predetermined duration, and to disable the authorization for extending or reactivating using the previous service-dependent user identifier when the duration having passed is greater than or equal to the predetermined duration, wherein the system is configured to associate a predetermined service-dependent user identifier at first to the first device for controlling a service access authorization, and to associate the predetermined service-dependent user identifier, after being released for being used again, to the second device for controlling a service access authorization, and wherein the system is configured such that the authorization for extending or reactivating the service access authorization using a predetermined service-dependent user identifier is active in at most one of the first device for controlling a service access authorization and the second device for controlling a service access authorization, and wherein the first device for controlling a service access authorization and the second device for controlling a service access authorization are coupled to the device for providing an authorization message so as to receive the authorization message.

11. The system in accordance with claim 10, wherein the system is configured to transmit the authorization message via a digital video broadcast system or audio broadcast system, via a mobile radio system, via a line-switched or package-switched voice network or data network, an Internet protocol system, a GSM system or UMTS system or CDMA system, a GPS system or a DSL system in a conducted or wireless manner.

12. The system in accordance with claim 10, wherein the system is configured to use the same predetermined duration for the device for providing an authorization message, for the first device for controlling a service access authorization and for the second device for controlling a service access authorization, and wherein the system is configured to transmit the predetermined duration when enabling the service or to consider same to be a fixed quantity of the system or to determine same from known parameters of the system.

13. The system in accordance with claim 10, wherein the device for providing an authorization message is configured to provide a service-dependent user identifier which comprises a range of values smaller than the product of a number of users registered in the system and a number of services registered in the system.

14. The system in accordance with claim 10, wherein the identifier manager of the device for providing an authorization message is configured to allocate the service-dependent user identifier temporarily, and wherein the system is configured to block the service-dependent user identifier for the user of the user device to which the service-dependent user identifier was associated last after expiry of the service access authorization to the expiry of the predetermined duration.

15. The system in accordance with claim 10, wherein the system is configured to partly or completely encrypt the authorization message with a cryptographic key using an encryption algorithm and to transmit same in a partly or completely encrypted manner.

16. The system in accordance with claim 15, wherein the system is configured to transmit the authorization message in a partly or completely encrypted manner using an encryption method.

17. The system in accordance with claim 10, wherein the system is configured to identify the authorization message using an electronic authentication method or an electronic signature.

18. The system in accordance with claim 17, wherein the system is configured to transmit the authorization message together with a message authentication code.

19. The system in accordance with claim 10, wherein the authorization message is specified in accordance with one of the OMA DRM, ETSI EUROCRYPT or ISMA standards.

20. The system in accordance with claim 10, wherein a user comprising an expired service access authorization is prevented from being able to access, by means of access data still present, the service access authorization of another user transmitted after expiry of the service access authorization using the same service-dependent user identifier.

21. A method for providing an authorization message for a user device with regard to an access-restricted service, the method comprising:

generating an enabling message for enabling a service access authorization or an extending message for extending a service access authorization, wherein the enabling message or the extending message is provided with a service-dependent user identifier provided by an identifier manager;

leaving the service-dependent user identifier unused for at least a predetermined duration after expiry of an authorization time interval of a user device to which the service-dependent user identifier was associated last; and after expiry of the predetermined duration, releasing the service-dependent user identifier for being used again for generating a new enabling message or a new extending message;

wherein the identifier manager comprises
a first block of associated service-dependent user identifiers in which an authorization time interval of a user device is running,
a second block of unused service-dependent user identifiers in which the authorization time interval of the user device has expired by less than the predetermined duration, and
a third block of service-dependent user identifiers released for being used again;

wherein the method is performed by a hardware apparatus, or by a computer, or by a combination of a hardware apparatus and a computer.

22. A non-transitory computer readable medium comprising a computer program comprising program code for executing a method on a computer for providing an authorization message for a user device with regard to an access-restricted service, the method comprising: generating an enabling message for enabling a service access authorization or an extending message for extending a service access authorization, wherein the enabling message or the extending message is provided with a service-dependent user identifier; not using the service-dependent user identifier for at least a predetermined duration after expiry of an authorization time interval of a user device to which the service-dependent user identifier was associated last; and after expiry of the predetermined duration, releasing the service-dependent user identifier for generating a new enabling message or a new extending message, when the computer program runs on a computer wherein there is a first block of associated service-dependent user identifiers in which an authorization time interval of a user device is running, a second block of unused service-dependent user identifiers in which the authorization time interval of the user device has expired by less than the predetermined duration, and a third block of service-dependent user identifiers released for being used again.

* * * * *